(12) United States Patent
Greally (10) Patent No.: US 11,781,531 B2
(45) Date of Patent: Oct. 10, 2023

(54) RECUMBENT BICYCLE-POWERED GENERATOR USING AN ALTERNATOR, FLYWHEEL AND SPROCKET AND CHAIN SYSTEM

(71) Applicant: Emma K. Greally, Park City, UT (US)

(72) Inventor: Emma K. Greally, Park City, UT (US)

(*) Notice: Subject to any disclaimer, the term of this patent is extended or adjusted under 35 U.S.C. 154(b) by 426 days.

(21) Appl. No.: 17/191,498

(22) Filed: Mar. 3, 2021

(65) Prior Publication Data
US 2022/0056894 A1 Feb. 24, 2022

Related U.S. Application Data

(60) Provisional application No. 63/068,518, filed on Aug. 21, 2020.

(51) Int. Cl.
| | |
|---|---|
| *H02K 7/116* | (2006.01) |
| *F03G 5/06* | (2006.01) |
| *F16H 37/06* | (2006.01) |
| *H02K 7/02* | (2006.01) |
| *H02K 7/18* | (2006.01) |
| *H02K 11/00* | (2016.01) |
| *A63B 21/22* | (2006.01) |
| *A63B 22/06* | (2006.01) |

(52) U.S. Cl.
CPC .............. *F03G 5/06* (2013.01); *A63B 21/225* (2013.01); *F16H 37/065* (2013.01); *H02K 7/02* (2013.01); *H02K 7/116* (2013.01); *H02K 7/1853* (2013.01); *H02K 11/0094* (2013.01); *A63B 2022/0611* (2013.01); *A63B 2022/0652* (2013.01)

(58) Field of Classification Search
CPC ...... H02K 7/1853; H02K 7/1861; H02K 7/02; H02K 7/116
See application file for complete search history.

(56) References Cited

U.S. PATENT DOCUMENTS

| | | | | |
|---|---|---|---|---|
| 4,768,607 | A * | 9/1988 | Molina | .................... B60L 50/30 930/DIG. 821 |
| 6,983,948 | B2 * | 1/2006 | Denison | .................... B62M 1/10 280/217 |
| 7,253,534 | B2 * | 8/2007 | Vasilovich | ................ F03G 5/06 290/1 R |

* cited by examiner

*Primary Examiner* — Dang D Le
(74) *Attorney, Agent, or Firm* — Bryant J. Keller; Kirton McConkie (57) ABSTRACT

A human-powered generator includes a frame and a pedal crankset and crankset sprocket rotatably mounted on the frame, a flywheel rotatably mounted on the frame including a flywheel-crankset sprocket a flywheel-countershaft sprocket, a countershaft rotatably mounted on the frame including a countershaft-flywheel sprocket and a countershaft-alternator sprocket, and an alternator including an alternator drive shaft and an alternator sprocket. The human-powered generator also includes a crankset-flywheel drive chain, a flywheel-countershaft drive chain, and a countershaft-alternator drive chain. A pedaling cadence at the pedal crankset of between approximately 60 RPM and approximately 100 RPM achieves an alternator drive shaft RPM of between approximately 2,000 RPM and approximately 5,000 RPM.

20 Claims, 7 Drawing Sheets

RECUMBENT BICYCLE-POWERED GENERATOR USING AN ALTERNATOR, FLYWHEEL AND SPROCKET AND CHAIN SYSTEM

CROSS-REFERENCE TO RELATED APPLICATIONS

This application claims the benefit of U.S. Provisional Application No. 63/068,518, filed Aug. 21, 2020.

BACKGROUND OF THE INVENTION

1. Field of the Invention

The present invention relates to electricity generation, and more particularly to human-powered generators.

2. Background and Related Art

One of the world's most-pressing needs is to develop and provide clean, renewable energy sources to replace traditional fossil fuels. This need is particularly felt in places where traditional renewable and clean (or cleaner) power sources (e.g., wind power, solar power, and nuclear power) are not readily accessible. In particular, access to renewable energy sources is often limited in many locales by a lack of energy distribution and transmission resources. While such difficulties are often particularly widespread in less-developed parts of the world, access to renewable energy sources can be limited due to a variety of reasons.

Even where renewable energy sources are available, many types of renewable energy are not entirely dependable. Solar energy is unavailable when the sun is not shining for any reason or cannot be seen (is behind foliage or clouds). Wind power is also only available when the wind is blowing. While batteries or other potential energy-storage systems can allow renewable energy to be stored for later use, including batteries or other energy storage in a renewable-energy system of sufficient size to permit these types of renewable energy to be dependably relied on to provide electricity on demand can increase the cost and complexity of the system while still not guaranteeing sufficient storage for energy to be available when needed. Accordingly, renewable energy systems that can provide sufficient amounts of energy on demand are needed.

BRIEF SUMMARY OF THE INVENTION

Implementations of the invention provide human-powered electrical energy generation systems provided in the general form of a bicycle, specifically a recumbent bicycle. The bicycle is occupied by a human who uses his or her legs (generally) to drive an alternator through a drive system that transduces the human movement into rotations at the alternator sufficient to drive the alternator at an optimal rotation speed to allow the alternator to generate power. The drive system in certain implementations of the invention utilizes a chain-and-sprocket assembly that eliminates belt slippage or other energy losses. Implementations of the invention also include a flywheel to provide additional system momentum to reduce energy fluctuations.

Implementation of the invention provides on the order of at least approximately 3,000 rotations per minute (RPM) to the alternator drive shaft. These high rotations allow the alternator to be more efficient and easier to use for a wider variety of individuals with varying degrees of cycling ability and power. The sprocket-and-chain assembly of certain implementations of the invention provides a durable assembly by which to transfer energy from pedals of the recumbent bicycle to the alternator while also permitting readily adjustable gear ratios that can be modified for each user to modify pedaling resistance and power generation capability.

Certain implementations of the invention also provide a system that is relatively compact and portable and that is ergonomic. Implementations of the invention provide adjustability to allow the system to be used by a variety of users. Some implementations of the invention include a modestly sized battery to store energy generated by the alternator.

According to certain implementations of the invention, a human-powered generator includes a frame and a pedal crankset including a pedal operatively connected to a crankset sprocket, the pedal crankset being rotatably mounted on the frame. The human-powered generator also includes a flywheel rotatably mounted on the frame. The flywheel includes a flywheel-crankset sprocket attached to rotate with the flywheel and a flywheel-countershaft sprocket attached to rotate with the flywheel. The human-powered generator also includes a countershaft rotatably mounted on the frame. The countershaft includes a countershaft-flywheel sprocket attached to rotate with the countershaft and a countershaft-alternator sprocket attached to rotate with the countershaft. The human-powered generator also includes an alternator mounted on the frame. The alternator includes an alternator drive shaft and an alternator sprocket mounted to the alternator drive shaft. The human-powered generator also includes a crankset-flywheel drive chain operatively extending between the crankset sprocket and the flywheel-crankset sprocket, a flywheel-countershaft drive chain operatively extending between the flywheel-countershaft sprocket and the countershaft-flywheel sprocket, and a countershaft-alternator drive chain operatively extending between the countershaft-alternator sprocket and the alternator sprocket. The crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 60 rotations per minute (RPM) and approximately 100 RPM achieves an alternator drive shaft RPM of between approximately 2,000 RPM and approximately 5,000 RPM.

In some implementations, the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 80 RPM and approximately 90 RPM achieves an alternator drive shaft RPM of between approximately 2,500 RPM and approximately 3,500 RPM. In some implementations, the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of approximately 86 RPM achieves an alternator drive shaft RPM of approximately 3,100 RPM.

In some implementations, the crankset sprocket and the flywheel-crankset sprocket have a gear ratio of between approximately 3.0 and approximately 3.5, the flywheel-countershaft sprocket and the countershaft-flywheel sprocket have a gear ratio of between approximately 3.0 and approximately 3.5, and the countershaft-alternator sprocket and the alternator sprocket have a gear ratio of between approximately 3.0 and approximately 3.5. In some implementations, the crankset sprocket and the flywheel-crankset sprocket have a gear ratio of between approximately 3.2 and approximately 3.5, the flywheel-countershaft sprocket and the countershaft-flywheel sprocket have a gear ratio of between approximately 3.2 and approximately 3.5, and the countershaft-alternator sprocket and the alternator sprocket have a gear ratio of between approximately 3.2 and approximately 3.5. In some implementations, the crankset sprocket and the flywheel-crankset sprocket have a gear ratio of between approximately 3.2 and approximately 3.25, the flywheel-countershaft sprocket and the countershaft-flywheel sprocket have a gear ratio of between approximately 3.2 and approximately 3.25, and the countershaft-alternator sprocket and the alternator sprocket have a gear ratio of between approximately 3.4 and approximately 3.5. In some implementations, the crankset sprocket and the flywheel-crankset sprocket have a gear ratio of approximately 3.25, the flywheel-countershaft sprocket and the countershaft-flywheel sprocket have a gear ratio of approximately 3.2, and the countershaft-alternator sprocket and the alternator sprocket have a gear ratio of approximately 3.43.

In some implementations, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 30 to approximately 45. In some implementations, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 33 to approximately 40. In some implementations, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 35 to approximately 37.

In some implementations, the human-powered generator further includes a recumbent seat adjustably mounted to the frame. In some implementations, the frame includes a crankset bracket, a flywheel mounting bracket, a countershaft mounting bracket, an alternator mounting bracket, and wheels to facilitate moving the human-powered generator.

In some implementations, the human-powered generator further includes an electrical load operatively connected to the alternator. In some implementations, the electrical load includes a battery. In some implementations, the alternator is rated at between approximately 50 and approximately 100 amps. In some implementations, the alternator is rated at approximately 70 amps.

In some implementations, at least one of the crankset sprocket, the flywheel-crankset sprocket, the flywheel-countershaft sprocket, the countershaft-flywheel sprocket, the countershaft-alternator sprocket and the alternator sprocket are user-replaceable with at least one of the crankset-flywheel drive chain, the flywheel-countershaft drive chain, and the countershaft-alternator drive chain to modify a gear ratio of the human-powered generator.

In some implementations, the flywheel-crankset sprocket is mounted on a first side of the flywheel and the flywheel-countershaft sprocket is mounted on a second side of the flywheel. In some implementations, the countershaft-flywheel sprocket is mounted on a first side of the countershaft and the countershaft-alternator sprocket is mounted on a second side of the countershaft.

According to certain implementations of the invention, a human-powered generator includes a frame and a recumbent seat adjustably mounted on the frame. The human-powered generator also includes a pedal crankset including a pedal operatively connected to a crankset sprocket, the pedal crankset being rotatably mounted at a crankset bracket on the frame. The human-powered generator also includes a flywheel rotatably mounted on at a flywheel bracket on the frame. The flywheel includes a flywheel-crankset sprocket attached to rotate with the flywheel and a flywheel-countershaft sprocket attached to rotate with the flywheel. The human-powered generator also includes a countershaft rotatably mounted at a countershaft bracket on the frame. The countershaft includes a countershaft-flywheel sprocket attached to rotate with the countershaft and a countershaft-alternator sprocket attached to rotate with the countershaft. The human-powered generator also includes an alternator mounted at an alternator bracket on the frame. The alternator includes an alternator drive shaft and an alternator sprocket mounted to the alternator drive shaft. The human-powered generator also includes a crankset-flywheel drive chain operatively extending between the crankset sprocket and the flywheel-crankset sprocket, a flywheel-countershaft drive chain operatively extending between the flywheel-countershaft sprocket and the countershaft-flywheel sprocket, and a countershaft-alternator drive chain operatively extending between the countershaft-alternator sprocket and the alternator sprocket. The crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 60 RPM and approximately 100 RPM achieves an alternator drive shaft RPM of between approximately 2,000 RPM and approximately 5,000 RPM.

In some implementations, the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 80 RPM and approximately 90 RPM achieves an alternator drive shaft RPM of between approximately 2,500 RPM and approximately 3,500 RPM. In some implementations, the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of approximately 86 RPM achieves an alternator drive shaft RPM of approximately 3,100 RPM.

In some implementations, the crankset sprocket and the flywheel-crankset sprocket have a gear ratio of between approximately 3.0 and approximately 3.5, the flywheel-countershaft sprocket and the countershaft-flywheel sprocket have a gear ratio of between approximately 3.0 and approximately 3.5, and the countershaft-alternator sprocket and the alternator sprocket have a gear ratio of between approximately 3.0 and approximately 3.5. In some implementations, the crankset sprocket and the flywheel-crankset sprocket have a gear ratio of between approximately 3.2 and approximately 3.5, the flywheel-countershaft sprocket and the countershaft-flywheel sprocket have a gear ratio of between approximately 3.2 and approximately 3.5, and the countershaft-alternator sprocket and the alternator sprocket have a gear ratio of between approximately 3.2 and approximately 3.5. In some implementations, the crankset sprocket and the flywheel-crankset sprocket have a gear ratio of between approximately 3.2 and approximately 3.25, the flywheel-countershaft sprocket and the countershaft-flywheel sprocket have a gear ratio of between approximately 3.2 and approximately 3.25, and the countershaft-alternator sprocket and the alternator sprocket have a gear ratio of between approximately 3.4 and approximately 3.5. In some implementations, the crankset sprocket and the flywheel-crankset sprocket have a gear ratio of approximately 3.25, the flywheel-countershaft sprocket and the countershaft-flywheel sprocket have a gear ratio of approximately 3.2, and the countershaft-alternator sprocket and the alternator sprocket have a gear ratio of approximately 3.43.

In some implementations, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 30 to approximately 45. In some implementations, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 33 to approximately 40. In some implementations, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 35 to approximately 37.

In some implementations, the human-powered generator further includes a recumbent seat adjustably mounted to the frame. In some implementations, the frame includes wheels to facilitate moving the human-powered generator. In some implementations, the human-powered generator further includes an electrical load operatively connected to the alternator. In some implementations, the electrical load includes a battery. In some implementations, the alternator is rated at between approximately 50 and approximately 100 amps. In some implementations, the alternator is rated at approximately 70 amps.

In some implementations, at least one of the crankset sprocket, the flywheel-crankset sprocket, the flywheel-countershaft sprocket, the countershaft-flywheel sprocket, the countershaft-alternator sprocket and the alternator sprocket are user-replaceable with at least one of the crankset-flywheel drive chain, the flywheel-countershaft drive chain, and the countershaft-alternator drive chain to modify a gear ratio of the human-powered generator.

In some implementations, the flywheel-crankset sprocket is mounted on a first side of the flywheel and the flywheel-countershaft sprocket is mounted on a second side of the flywheel. In some implementations, the countershaft-flywheel sprocket is mounted on a first side of the countershaft and the countershaft-alternator sprocket is mounted on a second side of the countershaft.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide human-powered electrical energy generation systems provided in the general form of a bicycle, specifically a recumbent bicycle. The bicycle is occupied by a human who uses his or her legs (generally) to drive an alternator through a drive system that transduces the human movement into rotations at the alternator sufficient to drive the alternator at an optimal rotation speed to allow the alternator to generate power. The drive system in certain embodiments of the invention utilizes a chain-and-sprocket assembly that eliminates belt slippage or other energy losses. Embodiments of the invention also include a flywheel to provide additional system momentum to reduce energy fluctuations.

Embodiments of the invention provides on the order of at least approximately 3,000 rotations per minute (RPM) to the alternator drive shaft. These high rotations allow the alternator to be more efficient and easier to use for a wider variety of individuals with varying degrees of cycling ability and power. The sprocket-and-chain assembly of certain embodiments of the invention provides a durable assembly by which to transfer energy from pedals of the recumbent bicycle to the alternator while also permitting readily adjustable gear ratios that can be modified for each user to modify pedaling resistance and power generation capability.

Certain embodiments of the invention also provide a system that is relatively compact and portable and that is ergonomic. Embodiments of the invention provide adjustability to allow the system to be used by a variety of users. Some embodiments of the invention include a modestly sized battery to store energy generated by the alternator.

According to certain embodiments of the invention, a human-powered generator includes a frame and a pedal crankset including a pedal operatively connected to a crankset sprocket, the pedal crankset being rotatably mounted on the frame. The human-powered generator also includes a flywheel rotatably mounted on the frame. The flywheel includes a flywheel-crankset sprocket attached to rotate with the flywheel and a flywheel-countershaft sprocket attached to rotate with the flywheel. The human-powered generator also includes a countershaft rotatably mounted on the frame. The countershaft includes a countershaft-flywheel sprocket attached to rotate with the countershaft and a countershaft-alternator sprocket attached to rotate with the countershaft. The human-powered generator also includes an alternator mounted on the frame. The alternator includes an alternator drive shaft and an alternator sprocket mounted to the alternator drive shaft. The human-powered generator also includes a crankset-flywheel drive chain operatively extending between the crankset sprocket and the flywheel-crankset sprocket, a flywheel-countershaft drive chain operatively extending between the flywheel-countershaft sprocket and the countershaft-flywheel sprocket, and a countershaft-alternator drive chain operatively extending between the countershaft-alternator sprocket and the alternator sprocket. The crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 60 rotations per minute (RPM) and approximately 100 RPM achieves an alternator drive shaft RPM of between approximately 2,000 RPM and approximately 5,000 RPM.

In some embodiments, the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 80 RPM and approximately 90 RPM achieves an alternator drive shaft RPM of between approximately 2,500 RPM and approximately 3,500 RPM. In some embodiments, the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of approximately 86 RPM achieves an alternator drive shaft RPM of approximately 3,100 RPM.

In some embodiments, the crankset sprocket and the flywheel-crankset sprocket have a gear ratio of between approximately 3.0 and approximately 3.5, the flywheel-countershaft sprocket and the countershaft-flywheel sprocket have a gear ratio of between approximately 3.0 and approximately 3.5, and the countershaft-alternator sprocket and the alternator sprocket have a gear ratio of between approximately 3.0 and approximately 3.5. In some embodiments, the crankset sprocket and the flywheel-crankset sprocket have a gear ratio of between approximately 3.2 and approximately 3.5, the flywheel-countershaft sprocket and the countershaft-flywheel sprocket have a gear ratio of between approximately 3.2 and approximately 3.5, and the countershaft-alternator sprocket and the alternator sprocket have a gear ratio of between approximately 3.2 and approximately 3.5. In some embodiments, the crankset sprocket and the flywheel-crankset sprocket have a gear ratio of between approximately 3.2 and approximately 3.25, the flywheel-countershaft sprocket and the countershaft-flywheel sprocket have a gear ratio of between approximately 3.2 and approximately 3.25, and the countershaft-alternator sprocket and the alternator sprocket have a gear ratio of between approximately 3.4 and approximately 3.5. In some embodiments, the crankset sprocket and the flywheel-crankset sprocket have a gear ratio of approximately 3.25, the flywheel-countershaft sprocket and the countershaft-flywheel sprocket have a gear ratio of approximately 3.2, and the countershaft-alternator sprocket and the alternator sprocket have a gear ratio of approximately 3.43.

In some embodiments, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 30 to approximately 45. In some embodiments, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 33 to approximately 40. In some embodiments, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 35 to approximately 37.

In some embodiments, the human-powered generator further includes a recumbent seat adjustably mounted to the frame. In some embodiments, the frame includes a crankset bracket, a flywheel mounting bracket, a countershaft mounting bracket, an alternator mounting bracket, and wheels to facilitate moving the human-powered generator.

In some embodiments, the human-powered generator further includes an electrical load operatively connected to the alternator. In some embodiments, the electrical load includes a battery. In some embodiments, the alternator is rated at between approximately 50 and approximately 100 amps. In some embodiments, the alternator is rated at approximately 70 amps.

In some embodiments, at least one of the crankset sprocket, the flywheel-crankset sprocket, the flywheel-countershaft sprocket, the countershaft-flywheel sprocket, the countershaft-alternator sprocket and the alternator sprocket are user-replaceable with at least one of the crankset-flywheel drive chain, the flywheel-countershaft drive chain, and the countershaft-alternator drive chain to modify a gear ratio of the human-powered generator.

In some embodiments, the flywheel-crankset sprocket is mounted on a first side of the flywheel and the flywheel-countershaft sprocket is mounted on a second side of the flywheel. In some embodiments, the countershaft-flywheel sprocket is mounted on a first side of the countershaft and the countershaft-alternator sprocket is mounted on a second side of the countershaft.

According to certain embodiments of the invention, a human-powered generator includes a frame and a recumbent seat adjustably mounted on the frame. The human-powered generator also includes a pedal crankset including a pedal operatively connected to a crankset sprocket, the pedal crankset being rotatably mounted at a crankset bracket on the frame. The human-powered generator also includes a flywheel rotatably mounted on at a flywheel bracket on the frame. The flywheel includes a flywheel-crankset sprocket attached to rotate with the flywheel and a flywheel-countershaft sprocket attached to rotate with the flywheel. The human-powered generator also includes a countershaft rotatably mounted at a countershaft bracket on the frame. The countershaft includes a countershaft-flywheel sprocket attached to rotate with the countershaft and a countershaft-alternator sprocket attached to rotate with the countershaft. The human-powered generator also includes an alternator mounted at an alternator bracket on the frame. The alternator includes an alternator drive shaft and an alternator sprocket mounted to the alternator drive shaft. The human-powered generator also includes a crankset-flywheel drive chain operatively extending between the crankset sprocket and the flywheel-crankset sprocket, a flywheel-countershaft drive chain operatively extending between the flywheel-countershaft sprocket and the countershaft-flywheel sprocket, and a countershaft-alternator drive chain operatively extending between the countershaft-alternator sprocket and the alternator sprocket. The crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 60 RPM and approximately 100 RPM achieves an alternator drive shaft RPM of between approximately 2,000 RPM and approximately 5,000 RPM.

In some embodiments, the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 80 RPM and approximately 90 RPM achieves an alternator drive shaft RPM of between approximately 2,500 RPM and approximately 3,500 RPM. In some embodiments, the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of approximately 86 RPM achieves an alternator drive shaft RPM of approximately 3,100 RPM.

In some embodiments, the crankset sprocket and the flywheel-crankset sprocket have a gear ratio of between approximately 3.0 and approximately 3.5, the flywheel-countershaft sprocket and the countershaft-flywheel sprocket have a gear ratio of between approximately 3.0 and approximately 3.5, and the countershaft-alternator sprocket and the alternator sprocket have a gear ratio of between approximately 3.0 and approximately 3.5. In some embodiments, the crankset sprocket and the flywheel-crankset sprocket have a gear ratio of between approximately 3.2 and approximately 3.5, the flywheel-countershaft sprocket and the countershaft-flywheel sprocket have a gear ratio of between approximately 3.2 and approximately 3.5, and the countershaft-alternator sprocket and the alternator sprocket have a gear ratio of between approximately 3.2 and approximately 3.5. In some embodiments, the crankset sprocket and the flywheel-crankset sprocket have a gear ratio of between approximately 3.2 and approximately 3.25, the flywheel-countershaft sprocket and the countershaft-flywheel sprocket have a gear ratio of between approximately 3.2 and approximately 3.25, and the countershaft-alternator sprocket and the alternator sprocket have a gear ratio of between approximately 3.4 and approximately 3.5. In some embodiments, the crankset sprocket and the flywheel-crankset sprocket have a gear ratio of approximately 3.25, the flywheel-countershaft sprocket and the countershaft-flywheel sprocket have a gear ratio of approximately 3.2, and the countershaft-alternator sprocket and the alternator sprocket have a gear ratio of approximately 3.43.

In some embodiments, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 30 to approximately 45. In some embodiments, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 33 to approximately 40. In some embodiments, a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 35 to approximately 37.

In some embodiments, the human-powered generator further includes a recumbent seat adjustably mounted to the frame. In some embodiments, the frame includes wheels to facilitate moving the human-powered generator. In some embodiments, the human-powered generator further includes an electrical load operatively connected to the alternator. In some embodiments, the electrical load includes a battery. In some embodiments, the alternator is rated at between approximately 50 and approximately 100 amps. In some embodiments, the alternator is rated at approximately 70 amps.

In some embodiments, at least one of the crankset sprocket, the flywheel-crankset sprocket, the flywheel-countershaft sprocket, the countershaft-flywheel sprocket, the countershaft-alternator sprocket and the alternator sprocket are user-replaceable with at least one of the crankset-flywheel drive chain, the flywheel-countershaft drive chain, and the countershaft-alternator drive chain to modify a gear ratio of the human-powered generator.

In some embodiments, the flywheel-crankset sprocket is mounted on a first side of the flywheel and the flywheel-countershaft sprocket is mounted on a second side of the flywheel. In some embodiments, the countershaft-flywheel sprocket is mounted on a first side of the countershaft and the countershaft-alternator sprocket is mounted on a second side of the countershaft.

Figure 1:
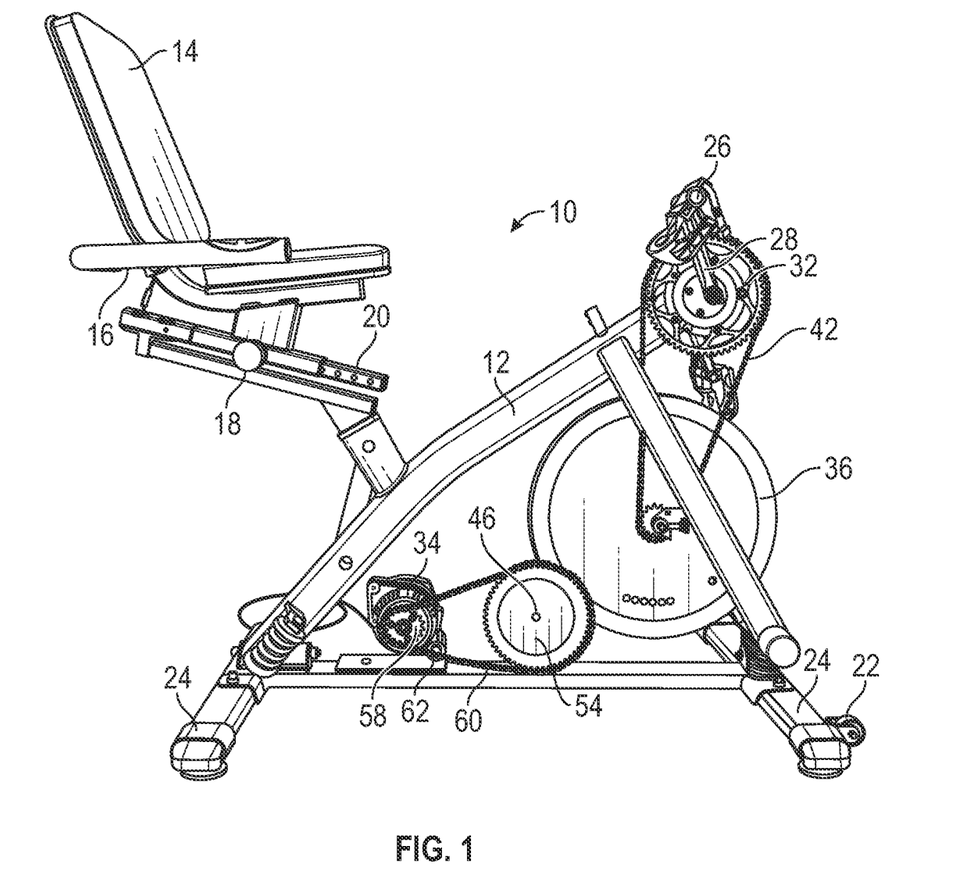
FIG. 1 shows a side-perspective view of an embodiment of a human-powered generator.
Figure 2:
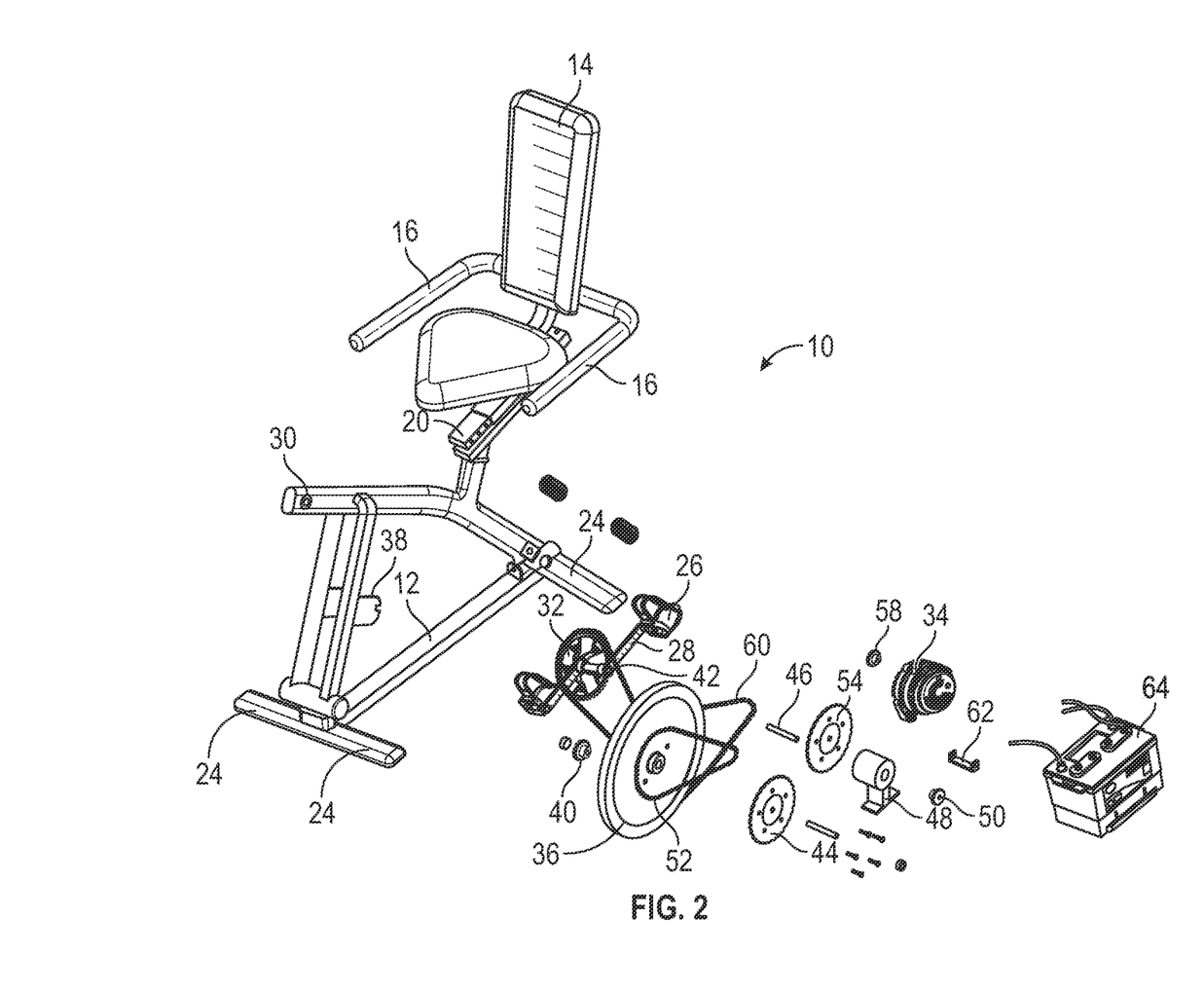
FIG. 2 shows a partially exploded perspective view of an embodiment of a human-powered generator.
Figure 3:
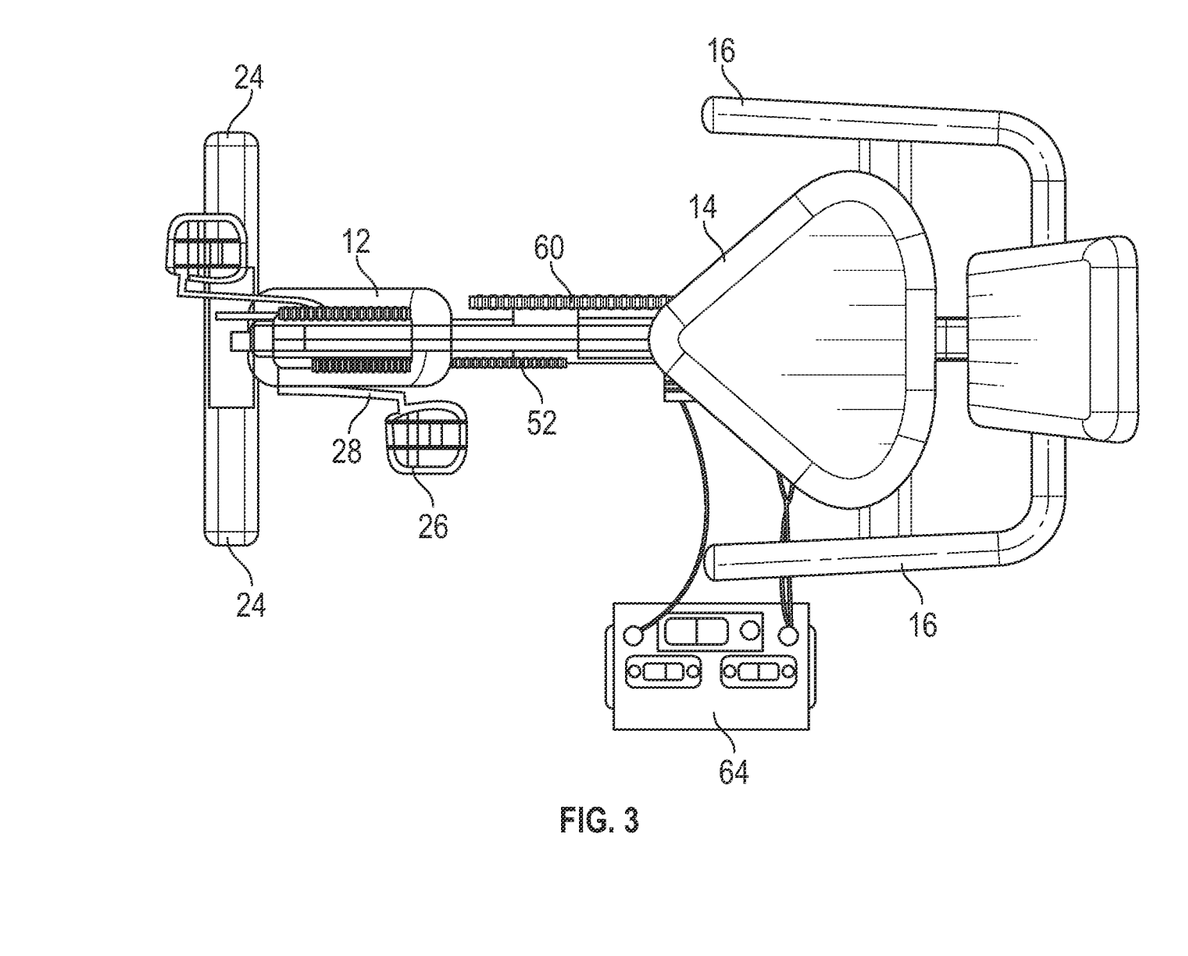
FIG. 3 shows a top view of an embodiment of a human-powered generator.
Figure 4:
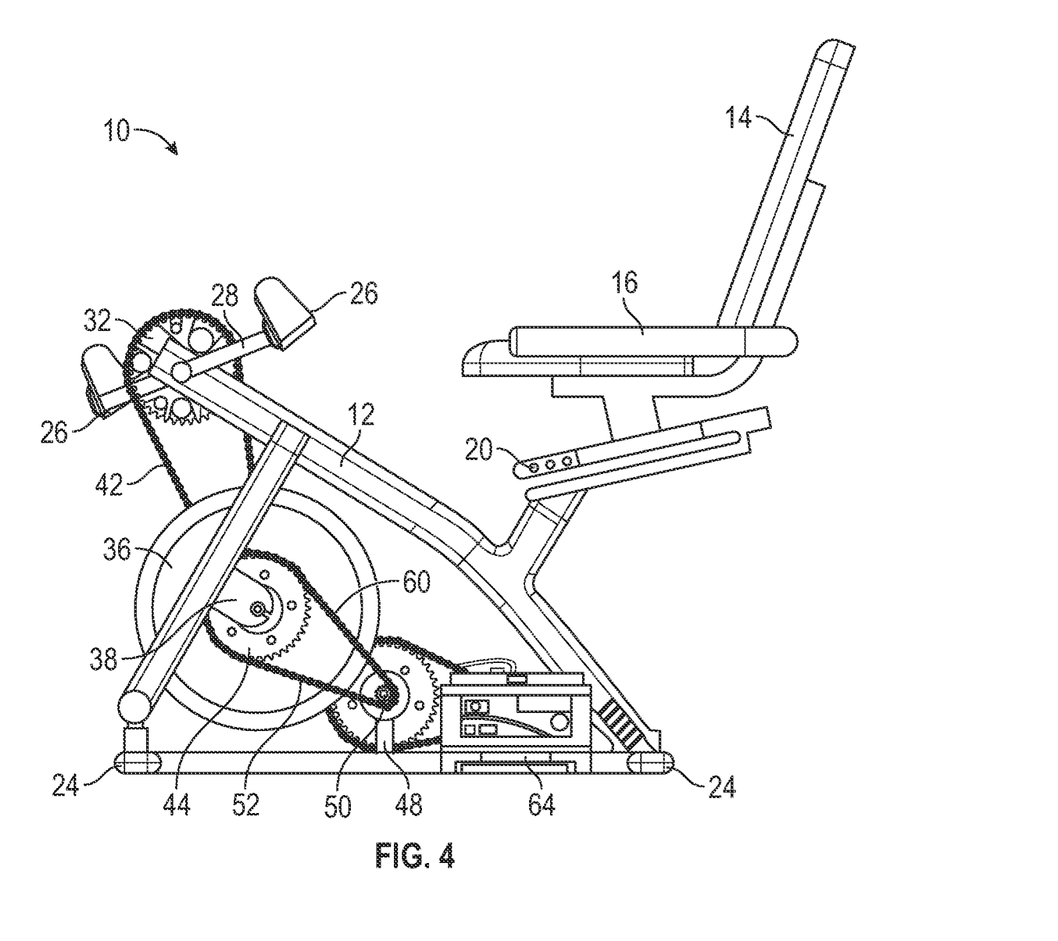
FIG. 4 shows a side view of an embodiment of a human-powered generator.
Figure 5:
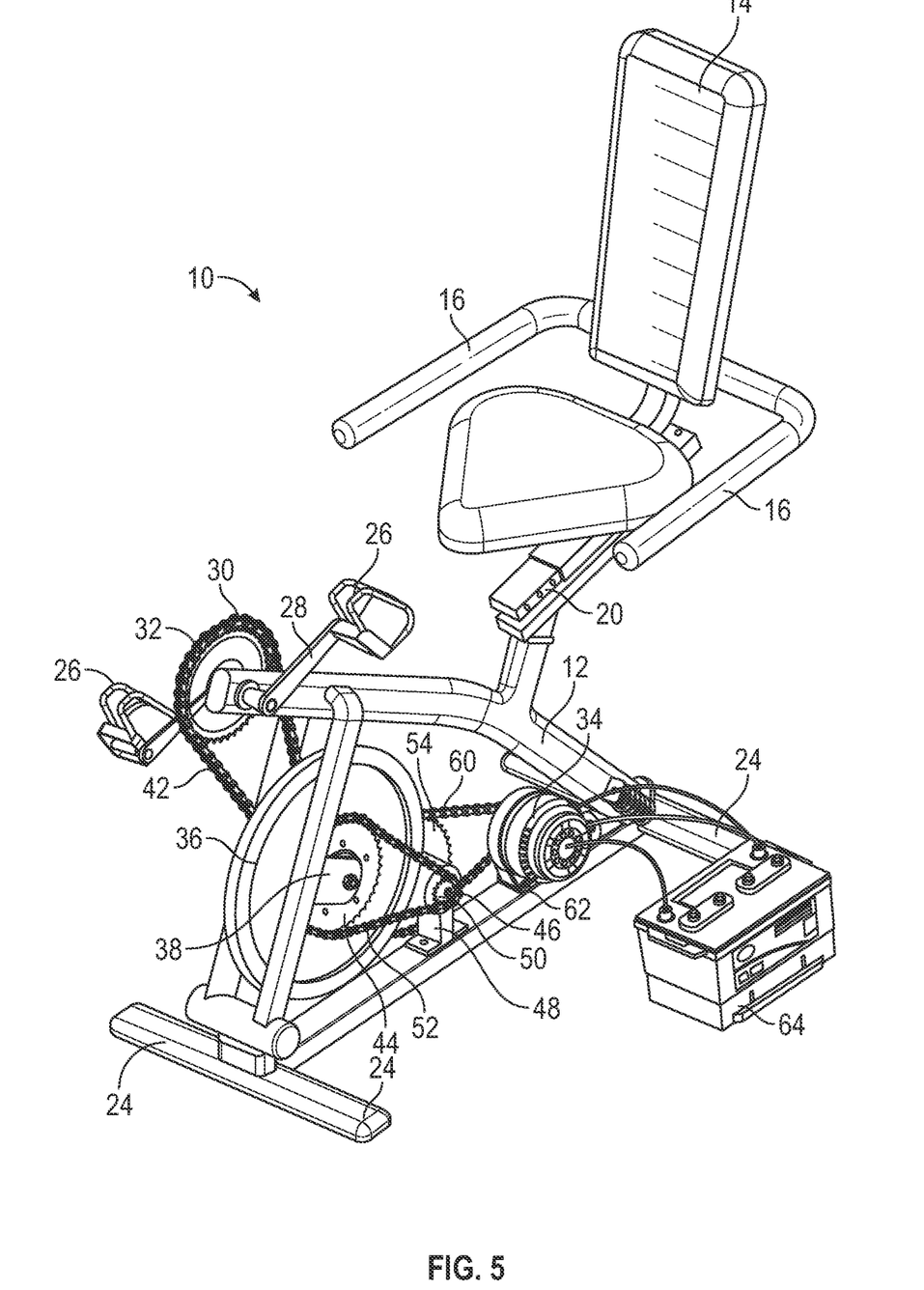
FIG. 5 shows a perspective view of an embodiment of a human-powered generator.
Figure 6:
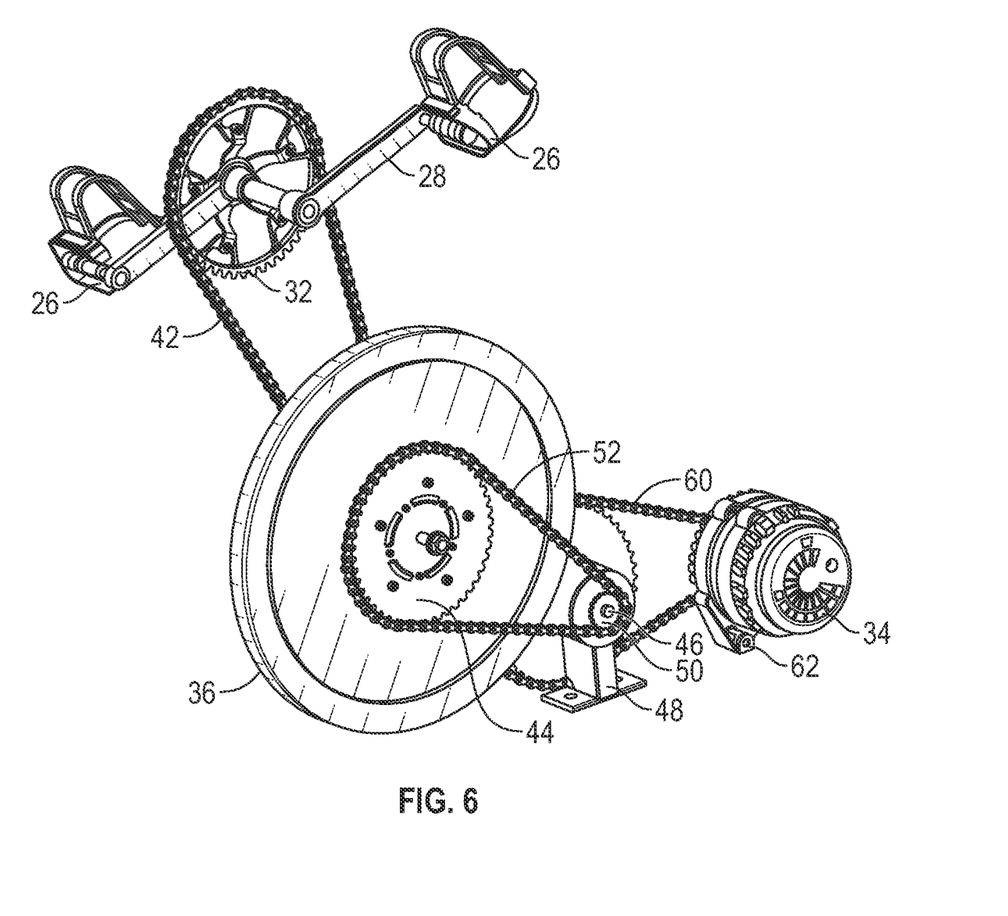
FIG. 6 shows a perspective view of an embodiment of a drive chain of an embodiment of a human-powered generator.
Figure 7:
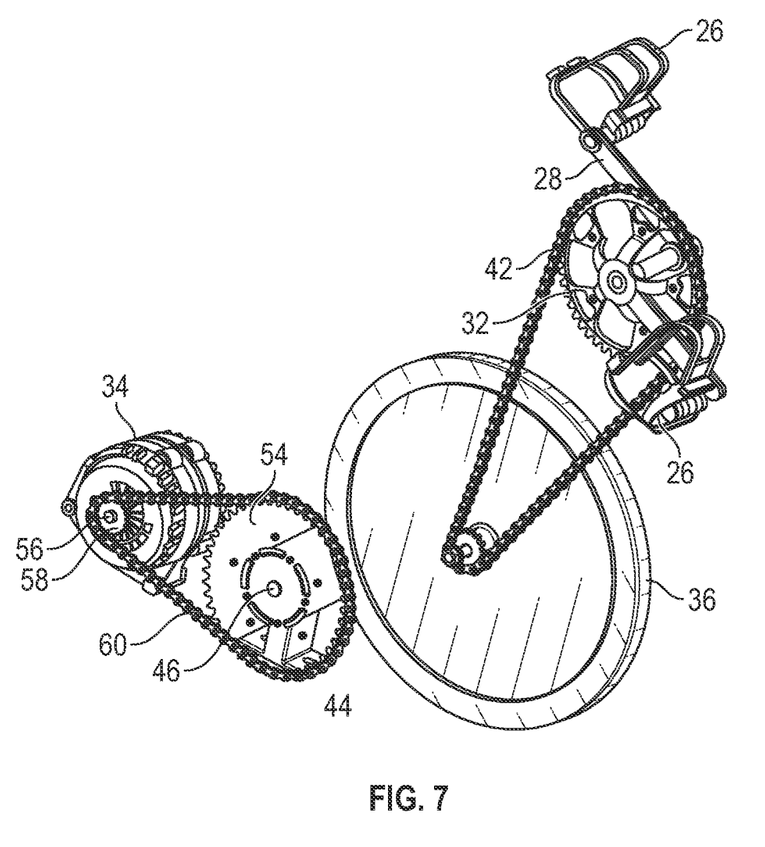
FIG. 7 shows an alternate perspective view of the drive chain of FIG. 6.

FIG. 1 illustrates a side perspective view of one embodiment of a human-powered generator (generator 10). FIG. 2 shows a partially exploded perspective view of the generator 10, FIG. 3 shows a top view thereof, FIG. 4 shows a side view thereof, and FIG. 5 shows another perspective view thereof. FIGS. 6 and 7 show alternate perspective views of a drive assembly of the generator 10.

The illustrated generator 10, its component parts, and the accompanying discussion are intended to illustrate principles associated with embodiments of the invention. Accordingly, while specific details about the illustrated generator 10 are provided herein, including details such as construction, materials, particular configurations, sizes, gear ratios, and the like, such details should be taken as illustrative, and not restrictive, unless specifically stated otherwise.

The generator 10 includes a frame 12. The frame 12 may take a variety of shapes and may be manufactured of a variety of materials using a variety of manufacturing processes. By way of example only, the frame 12 of certain embodiments is formed of one of a variety of aluminum or steel alloys or of other metal alloys such as titanium alloys. In some circumstances, the frame 12 is formed in whole or in part of one or more woods. The material or materials selected for the frame 12 may be selected at least in part according to availability of materials. Additional considerations in selecting and forming the frame 12 may include weight and strength.

While the generator 10 is illustrated as having a recumbent position and the frame 12 is formed accordingly, alternate embodiments of the generator 10 may provide user positioning in an upright position, in a reclined position, or in any desired position. Accordingly, the frame 12 of such embodiments is varied to account for varying user positions.

In the illustrated embodiment, a seat 14 is adjustably mounted to the frame 12. The adjustable mounting of the seat 14 to the frame 12 allows the seat 14 to be adjusted such that users of different dimensions (e.g., height, leg length) can use the generator 10 at a desired position and for maximum efficiency. The seat 14 in the illustrated embodiment is modestly padded, and padding may be added or removed in various embodiments, as desired, for comfort or other reasons. Additionally, while the seat 14 is shown as having a particular shape and configuration, it should be understood that alternate seats are envisioned as replacing the seat 14, and such alternate seats may have any desired shape and configuration for comfort, aesthetic, performance, and other considerations.

In the illustrated embodiment, the seat 14 includes handles 16 disposed thereon. The handles 16 allow a user of the generator 10 to grasp the handles 16 to mount or dismount the generator 10. Additionally, during use, the user of the generator 10 may grasp one or both of the handles 16 as desired for comfort or stability.

One or more adjustment mechanisms 18 allows the position of the seat 14 to be adjusted relative to the frame 12. The adjustment mechanism in the illustrated embodiment provides sliding adjustment of the seat 14 relative to the frame 12. In the illustrated embodiment, the adjustment mechanism includes a pin-in-hole mechanism that secures the seat 14 at any of a variety of positions along an adjustment bar 20. The adjustment mechanism 18 of some embodiments includes one or more features to lock the adjustment mechanism 18 against unwanted adjustment, such as bearing retainers, a hinged pin extension, a cotter pin, a screw-in pin, or the like. While one particular adjustment mechanism 18 is shown in FIG. 1, it should be understood that any desired type of adjustment mechanism may be used in other embodiments of the generator 10. In some embodiments, the adjustment mechanism 18 (or mechanisms) provides for multiple adjustment types, such as seat-to-pedal distance, seat angle, seat-back angle, seat-back height, seat height, and the like.

In the embodiment illustrated in FIG. 1, the generator 10 also includes wheels 22 to facilitate movement or transport of the generator 10 from place to place. In this embodiment, the wheels 22 are fixedly attached (e.g., are not swivel casters) a side edge of a foot 24 of the frame 12. Accordingly, when the generator 10 is to be moved, the generator 10 is tipped up (e.g., lifting the seat 14 up and to the right in the perspective of FIG. 1) until the wheels 22 contact the ground or other underlying surface, and then the generator 10 can be wheeled to any desired location. In some embodiments, the seat 14 can be removed or folded for storage of the generator 10, and the generator 10 can be stored on-end, with the wheels 22 contacting the underlying surface.

When the user is sitting in the seat 14, he or she extends her legs and places his or her feet in pedals 26 of a pedal crankset 28. The pedal crankset 28 is rotatably mounted to the frame 12 or a portion thereof (e.g., using appropriate bearings and shaft), such as using a crankset bracket 30 (see FIG. 2). In the illustrated embodiment, the crankset bracket 30 is formed as a passage extending through the frame 12. The rotatable mounting of the pedal crankset 28 allows the user to pedal the pedal crankset 28 using the pedals 26, and the rotation of the pedal crankset 28 can be converted into energy by the generator 10.

Accordingly, the pedal crankset 28 includes a crankset sprocket 32. The generator 10 is configured to convert relatively low-RPM revolutions of the crankset into relatively high-RPM revolutions at an alternator 34 of the system, and accordingly, each sprocket toward the crankset end of the drive chain of the generator 10 is comparatively larger than its corresponding sprocket toward the alternator end of the drive chain. In the illustrated embodiment, the crankset sprocket 32 has fifty-two teeth. Of course, it should be understood that the specific number of teeth of the crankset sprocket 32 and for all sprockets of the system can be varied in differing embodiments, as desired, to achieve a desired gear ratio of the drive chain of the generator 10. Accordingly, the specific number of teeth of the crankset sprocket 32 is not intended to be limiting.

Indeed, in alternate embodiments of the invention, the crankset sprocket 32 has any whole number of teeth between approximately forty teeth and approximately sixty-five teeth. Additionally, in some embodiments, the crankset sprocket 32 is user-interchangeable. In some such embodiments, the user is able to remove the crankset sprocket 32 having a certain number of teeth, and to replace a new crankset sprocket 32 with a different number of teeth, all without the use of tools. In other such embodiments, the changing of the crankset sprocket 32 with one of a different number of teeth occurs using tools. As may be appreciated, changing of the crankset sprocket 32 either with or without tools may necessitate replacing any affixed drive chain. As may further be appreciated, to achieve a desired tension on such a drive chain, certain embodiments provide for at least slight adjustment of the position of the crankset 28 (and the crankset sprocket 32). Accordingly, in some embodiments, the crankset bracket 30 is formed to permit adjustable positioning of the crankset 28 followed by locking the crankset 28 in place against all but rotational movement.

The drive chain of the generator 10 also includes a flywheel 36. The flywheel 36 serves to store rotational energy as momentum, such that the user of the generator 10 need not maintain constant pedaling at the crankset 28. Instead, if the user takes a brief rest, the momentum stored in the flywheel 36 continues to operate the alternator 34 for a period of time. In some embodiments, the pedal crankset 28 can be slowed or stopped while the flywheel 36 continues to rotate (e.g., using a freehub, freewheel, or other similar ratcheting assembly or the equivalent). As may be appreciated, the flywheel 36 may be formed of any desirable material and may be of any desirable weight. Accordingly, embodiments of the invention are not limited to any particular flywheel size, composition, or weight.

The flywheel 36 is rotatably mounted to the frame 12 (e.g., using appropriate bearings and shaft), such as at a flywheel bracket 38. The flywheel 36 includes, in the illustrated embodiment, sprocket mounting hubs on either side thereof, such that a sprocket can be mounted on each side of the flywheel 36. In alternate embodiments, the flywheel 36 includes a sprocket mounting hub on just one side of the flywheel 36, but the sprocket mounting hub is adapted to receive two sprockets thereon. Accordingly, embodiments of the invention are not limited to flywheels 36 with sprockets on both sides thereof.

A flywheel-crankset sprocket 40 is mounted on a first side of the flywheel 36 and is mounted on the sprocket hub such that the flywheel-crankset sprocket 40 rotates with the flywheel 36. The flywheel-crankset sprocket 40 corresponds to the crankset sprocket 32, such that a crankset-flywheel drive chain 42 extending therebetween transfers rotational movement of the pedal crankset 28 into rotational movement of the flywheel 36. In the illustrated embodiment, the flywheel-crankset sprocket 40 has sixteen teeth. Accordingly, there is a 3.25 gear ratio between the crankset sprocket 32 and the flywheel-crankset sprocket 40. In other words, for each revolution of the pedal crankset 28, the flywheel 36 revolves 3.25 times.

While in the illustrated embodiment of the generator 10, the flywheel-crankset sprocket 40 has sixteen teeth, in other embodiments, the flywheel-crankset sprocket 40 has another number of teeth. In some embodiments, the flywheel-crankset sprocket 40 has any whole number of teeth between approximately nine and approximately twenty-two teeth. Additionally, in some embodiments, the flywheel-crankset sprocket 40 is user-interchangeable. In some such embodiments, the user is able to remove the flywheel-crankset sprocket 40 having a certain number of teeth, and to replace a new flywheel-crankset sprocket 40 with a different number of teeth, all without the use of tools. In other such embodiments, the changing of the flywheel-crankset sprocket 32 with one of a different number of teeth occurs using tools. As may be appreciated, changing of the flywheel-crankset sprocket 32 either with or without tools may necessitate replacing the crankset-flywheel drive chain 42. As may further be appreciated, to achieve a desired tension on the crankset-flywheel drive chain 42, certain embodiments provide for at least slight adjustment of the position of the flywheel 36 (and thus the flywheel-crankset sprocket 40). Accordingly, in some embodiments, the flywheel bracket 38 is formed to permit adjustable positioning of the flywheel 36 followed by locking the flywheel 36 in place against all but rotational movement.

As may be appreciated, varying the number of teeth of the crankset sprocket 32 and/or the flywheel-crankset sprocket 40 modifies the gear ratio between the pedal crankset 28 and the flywheel 36. While the illustrated embodiment of the generator 10 has a gear ratio between the pedal crankset 28 and the flywheel 36 of 3.25, other gear ratios are achieved in other embodiments of the generator 10. By way of example only, in some embodiments, the gear ratio ranges between approximately 3.0 and approximately 3.5. In other embodiments, the gear ratio ranges between approximately 3.2 and approximately 3.5. In other embodiments, the gear ratio ranges between approximately 3.2 and approximately 3.25.

In the illustrated embodiment, there are three drive chains between the pedal crankset 28 and the alternator 34. Accordingly, there are three multiplying gear ratios between the pedal crankshaft 28 and the alternator 34; however, embodiments of the generator 10 are not limited to three multiplying gear ratios. In other embodiments of the generator 10, there are only two drive chains and accompanying gear ratios, while in other embodiments there are four or five drive chains and accompanying gear ratios. In embodiments with fewer drive chains and gear ratios, each gear ratio is or may be correspondingly larger. In contrast, in embodiments with more drive chains and gear ratios, each gear ratio is or may be correspondingly smaller. Accordingly, for at least these reasons, embodiments of the invention are not limited to any specific gear ratio described herein unless specifically stated in the particular claim.

A flywheel-countershaft sprocket 44 is mounted on the sprocket hub on the opposite side of the flywheel 36. The flywheel-countershaft sprocket 44 is mounted so as to rotate with the flywheel 36. The flywheel-countershaft sprocket 44 in the illustrated embodiment has forty-eight teeth. In alternate embodiments of the invention, the flywheel-countershaft sprocket 44 has any whole number of teeth between approximately forty teeth and approximately sixty-five teeth. Additionally, in some embodiments, the flywheel-countershaft sprocket 44 is user-interchangeable. In some such embodiments, the user is able to remove the flywheel-countershaft sprocket 44 having a certain number of teeth, and to replace a new flywheel-countershaft sprocket 44 with a different number of teeth, all without the use of tools. In other such embodiments, the changing of the flywheel-countershaft sprocket 44 with one of a different number of teeth occurs using tools. As may be appreciated, changing of the flywheel-countershaft sprocket 44 either with or without tools may necessitate replacing any affixed drive chain. As may further be appreciated, to achieve a desired tension on such a drive chain, the adjustable positioning of the flywheel 36 in the flywheel bracket 38 allows, in some embodiments, modification of such tension.

The drive chain of the generator 10 also includes a countershaft 46 (most clearly visible in FIGS. 6 and 7). The countershaft 46 serves as a hub for an extra stage in the drive chain, allowing for an additional multiplication of the gear ratio of the drive chain. While the illustrated embodiment of the generator 10 includes only a single countershaft 46, alternate embodiments include more than one countershaft 46 to provide one or more additional stages of the drive chain (allowing for a smaller gear ratio for each stage of the drive chain, as discussed above).

The countershaft 46 is rotatably mounted to the frame 12 (e.g., using appropriate bearings and shaft), such as at a countershaft bracket 48. Because the countershaft may revolve at speeds approaching and exceeding 1,000 RPM, the rotational mounting of the countershaft 46 at the countershaft bracket 48 is of a type adapted to endure long-term use at such speeds. The countershaft 46 includes, in the illustrated embodiment, sprocket mounting hubs on either side thereof, such that a sprocket can be mounted on each side of the countershaft 46. In alternate embodiments, the countershaft 46 includes a sprocket mounting hub on just one side of the countershaft 46, but the sprocket mounting hub is adapted to receive two sprockets thereon. Accordingly, embodiments of the invention are not limited to countershafts 46 with sprockets on both sides thereof.

A countershaft-flywheel sprocket 50 is mounted on a first side of the countershaft 46 and is mounted on the sprocket hub such that the countershaft-flywheel sprocket 50 rotates with the countershaft 46. The countershaft-flywheel sprocket 50 corresponds to the flywheel-countershaft sprocket 44, such that a flywheel-countershaft drive chain 52 extending therebetween transfers rotational movement of the flywheel 36 into rotational movement of the countershaft 46. In the illustrated embodiment, the countershaft-flywheel sprocket 50 has fifteen teeth. Accordingly, there is a 3.20 gear ratio between the flywheel-countershaft sprocket 44 and the countershaft-flywheel sprocket 50. In other words, for each revolution of the flywheel 36, the countershaft 46 revolves 3.20 times.

While in the illustrated embodiment of the generator 10, the countershaft-flywheel sprocket 50 has fifteen teeth, in other embodiments, the countershaft-flywheel sprocket 50 has another number of teeth. In some embodiments, the countershaft-flywheel sprocket 50 has any whole number of teeth between approximately nine and approximately twenty-two teeth. Additionally, in some embodiments, the countershaft-flywheel sprocket 50 is user-interchangeable. In some such embodiments, the user is able to remove the countershaft-flywheel sprocket 50 having a certain number of teeth, and to replace a new countershaft-flywheel sprocket 50 with a different number of teeth, all without the use of tools. In other such embodiments, the changing of the countershaft-flywheel sprocket 50 with one of a different number of teeth occurs using tools. As may be appreciated, changing of the countershaft-flywheel sprocket 50 either with or without tools may necessitate replacing the flywheel-countershaft drive chain 52. As may further be appreciated, to achieve a desired tension on the flywheel-countershaft drive chain 52, certain embodiments provide for at least slight adjustment of the position of the countershaft 46 (and thus the countershaft-flywheel sprocket 50). Accordingly, in some embodiments, the countershaft bracket 48 is formed to permit adjustable positioning of the countershaft 46 followed by locking the countershaft 46 in place against all but rotational movement, such as by adjusting a position of the countershaft bracket 48 on the frame 12.

As may be appreciated, varying the number of teeth of the flywheel-countershaft sprocket 44 and/or the countershaft-flywheel sprocket 50 modifies the gear ratio between the flywheel 36 and the countershaft 46. While the illustrated embodiment of the generator 10 has a gear ratio between the flywheel 36 and the countershaft 46 of 3.20, other gear ratios are achieved in other embodiments of the generator 10. By way of example only, in some embodiments, the gear ratio ranges between approximately 3.0 and approximately 3.5. In other embodiments, the gear ratio ranges between approximately 3.2 and approximately 3.5. In other embodiments, the gear ratio ranges between approximately 3.2 and approximately 3.25.

A countershaft-alternator sprocket 54 is mounted on the sprocket hub on the opposite side of the countershaft 46. The countershaft-alternator sprocket 54 is mounted so as to rotate with the countershaft 46. The countershaft-alternator sprocket 54 in the illustrated embodiment has forty-eight teeth. In alternate embodiments of the invention, the countershaft-alternator sprocket 54 has any whole number of teeth between approximately forty teeth and approximately sixty-five teeth. Additionally, in some embodiments, the countershaft-alternator sprocket 54 is user-interchangeable. In some such embodiments, the user is able to remove the countershaft-alternator sprocket 54 having a certain number of teeth, and to replace a new countershaft-alternator sprocket 54 with a different number of teeth, all without the use of tools. In other such embodiments, the changing of the countershaft-alternator sprocket 54 with one of a different number of teeth occurs using tools. As may be appreciated, changing of the countershaft-alternator sprocket 54 either with or without tools may necessitate replacing any affixed drive chain. As may further be appreciated, to achieve a desired tension on such a drive chain, the adjustable positioning of the countershaft 46 in or on the countershaft bracket 48 allows, in some embodiments, modification of such tension.

As mentioned previously, the drive chain of the generator 10 also includes the alternator 34. The alternator 34 converts rotational energy at an alternator drive shaft 56 into electrical energy, as is known in the art. In the illustrated embodiment, the alternator 34 is a standard seventy-amp automobile alternator outputting approximately fourteen volts. Alternate alternators may also be used, and the gear ratios of the various stages of the drive chain may be modified as necessary or desired so that the alternator 34 of any desired type operates in its most-efficient mode (e.g., rotation speed).

An alternator sprocket 58 is mounted on the alternator drive shaft 56, such that the alternator sprocket 58 rotates with the alternator drive shaft 56. The alternator sprocket 58 corresponds to the countershaft-alternator sprocket 54, such that a countershaft-alternator drive chain 60 extending therebetween transfers rotational movement of the countershaft 46 into rotational movement of the alternator 34. In the illustrated embodiment, the alternator sprocket 58 has fourteen teeth. Accordingly, there is a 3.43 gear ratio between the countershaft-alternator sprocket 54 and the alternator sprocket 58. In other words, for each revolution of the countershaft 46, the alternator drive shaft 56 revolves 3.20 times.

While in the illustrated embodiment of the generator 10, the alternator sprocket 58 has fourteen teeth, in other embodiments, the alternator sprocket 58 has another number of teeth. In some embodiments, the alternator sprocket 58 has any whole number of teeth between approximately nine and approximately twenty-two teeth. Additionally, in some embodiments, the alternator sprocket 58 is user-interchangeable. In some such embodiments, the user is able to remove the alternator sprocket 58 having a certain number of teeth, and to replace a new alternator sprocket 58 with a different number of teeth, all without the use of tools. In other such embodiments, the changing of the alternator sprocket 58 with one of a different number of teeth occurs using tools. As may be appreciated, changing of the alternator sprocket 58 either with or without tools may necessitate replacing the countershaft-alternator drive chain 60. The alternator 34 is mounted to the frame 12, such as at an alternator bracket 62. In some embodiments, the alternator 34 is rotatably mounted to the frame 12 at the alternator bracket 62, such that the alternator 34 can be rotated around the alternator bracket 62 and then fixed in place so as to adjust tension on the countershaft-alternator drive chain 60.

As may be appreciated, varying the number of teeth of the countershaft-alternator sprocket 54 and/or the alternator sprocket 58 modifies the gear ratio between the countershaft 46 and the alternator 34. While the illustrated embodiment of the generator 10 has a gear ratio between the countershaft 46 and the alternator 34 of 3.43, other gear ratios are achieved in other embodiments of the generator 10. By way of example only, in some embodiments, the gear ratio ranges between approximately 3.0 and approximately 3.5. In other embodiments, the gear ratio ranges between approximately 3.2 and approximately 3.5. In other embodiments, the gear ratio ranges between approximately 3.4 and approximately 3.5.

Regardless of the number of stages between the pedal crankset 28 and the alternator 34, the drive chain of embodiments of the generator 10 is geared such that a user pedaling the generator 10 at a maintainable speed or cadence (e.g., between approximately 60 RPM and approximately 100 RPM) achieves a rotation of the alternator drive shaft 56 in or near its optimal operational range (e.g., between approximately 2,000 RPM and approximately 5,000 RPM). One of ordinary skill in the art would be readily able to appreciate the manner in which the various sprockets and drive chains should be modified to achieve any desired gear ratio.

Nevertheless, by way of example only, certain embodiments of the drive chain are geared such that a pedaling cadence oat the pedal crankset of between approximately 60 RPM and approximately 100 RPM achieves an alternator shaft RPM of between approximately 2,000 RPM and approximately 5,000 RPM. Other embodiments of the drive chain are geared such that a pedaling cadence oat the pedal crankset of between approximately 60 RPM and approximately 100 RPM achieves an alternator shaft RPM of between approximately 2,500 RPM and approximately 3,500 RPM. Other embodiments of the drive chain are geared such that a pedaling cadence oat the pedal crankset of between approximately 60 RPM and approximately 100 RPM achieves an alternator shaft RPM of between approximately 3,000 RPM and approximately 3,200 RPM. Other embodiments of the drive chain are geared such that a pedaling cadence oat the pedal crankset of between approximately 60 RPM and approximately 100 RPM achieves an alternator shaft RPM of approximately 3,100 RPM.

Certain embodiments of the drive chain are geared such that a pedaling cadence oat the pedal crankset of between approximately 80 RPM and approximately 90 RPM achieves an alternator shaft RPM of between approximately 2,000 RPM and approximately 5,000 RPM. Other embodiments of the drive chain are geared such that a pedaling cadence oat the pedal crankset of between approximately 80 RPM and approximately 90 RPM achieves an alternator shaft RPM of between approximately 2,500 RPM and approximately 3,500 RPM. Other embodiments of the drive chain are geared such that a pedaling cadence oat the pedal crankset of between approximately 80 RPM and approximately 90 RPM achieves an alternator shaft RPM of between approximately 3,000 RPM and approximately 3,200 RPM. Other embodiments of the drive chain are geared such that a pedaling cadence oat the pedal crankset of between approximately 80 RPM and approximately 90 RPM achieves an alternator shaft RPM of approximately 3,100 RPM.

Certain embodiments of the drive chain are geared such that a pedaling cadence oat the pedal crankset of approximately 86 RPM achieves an alternator shaft RPM of between approximately 2,000 RPM and approximately 5,000 RPM. Other embodiments of the drive chain are geared such that a pedaling cadence oat the pedal crankset of approximately 86 RPM achieves an alternator shaft RPM of between approximately 2,500 RPM and approximately 3,500 RPM. Other embodiments of the drive chain are geared such that a pedaling cadence oat the pedal crankset of approximately 86 RPM achieves an alternator shaft RPM of between approximately 3,000 RPM and approximately 3,200 RPM. Other embodiments of the drive chain are geared such that a pedaling cadence oat the pedal crankset of approximately 86 RPM achieves an alternator shaft RPM of approximately 3,100 RPM.

Accordingly, in certain embodiments, a combined gear ratio of the crankset sprocket 32 to the alternator sprocket 58, as transferred from the crankset sprocket 32 to the flywheel-crankset sprocket 40, from the flywheel-countershaft sprocket 44 to the countershaft-flywheel sprocket 50, and from the countershaft-alternator sprocket 54 to the alternator sprocket 58 is between approximately 30 to approximately 45. In some embodiments, a combined gear ratio of the crankset sprocket 32 to the alternator sprocket 58, as transferred from the crankset sprocket 32 to the flywheel-crankset sprocket 40, from the flywheel-countershaft sprocket 44 to the countershaft-flywheel sprocket 50, and from the countershaft-alternator sprocket 54 to the alternator sprocket 58 is between approximately 33 to approximately 40. In some embodiments, a combined gear ratio of the crankset sprocket 32 to the alternator sprocket 58, as transferred from the crankset sprocket 32 to the flywheel-crankset sprocket 40, from the flywheel-countershaft sprocket 44 to the countershaft-flywheel sprocket 50, and from the countershaft-alternator sprocket 54 to the alternator sprocket 58 is between approximately 35 to approximately 37. In some embodiments, a combined gear ratio of the crankset sprocket 32 to the alternator sprocket 58, as transferred from the crankset sprocket 32 to the flywheel-crankset sprocket 40, from the flywheel-countershaft sprocket 44 to the countershaft-flywheel sprocket 50, and from the countershaft-alternator sprocket 54 to the alternator sprocket 58 is approximately 35.67.

While specific gear ratios, RPM ratios, and the like have been described herein, such ratios and examples are intended to be exemplary only, and not restrictive.

In embodiments of the invention, an electrical load is attached to the alternator 34. A small amount of power is supplied to the alternator's excitation circuit contact, so as to energize the magnetic field of the alternator 34. This allows the alternator 34 to produce electricity when the alternator drive shaft 56 reaches its minimum generation speed. In some embodiments, such as those illustrated in the Figures, the electrical load is a battery 64 (e.g., a twelve-volt automotive or deep-cycle battery) that serves both to store generated energy and also to supply the alternator's excitation circuit. The battery 64 may be replaced as needed (e.g., once charged) and may be used in place or disconnected from the generator 10 and used elsewhere.

As discussed herein, embodiments of the generator 10 use a sprocket-and-chain assembly to deliver rotational motion from the pedal crankset 28 to the alternator 34. Such assemblies eliminate belt slippage and energy/efficiency loss from belt-drive systems used in other generators. Furthermore, the sprocket-and-chain assembly is significantly more durable than belt-drive systems. Additionally, embodiments of the generator are ergonomic and adjustable to permit use by users of all heights. Further, gear ratios can be adjusted on a per-user basis to increase or decrease pedaling resistance and power generation capability. The generator 10 has a compact and portable design.

Embodiments of the invention generate significantly increased revolution speeds at the alternator drive shaft 56 when compared with other human-powered generators. The increased drive shaft speed allows the alternator 34 to operate in its most-efficient operation mode, making the generator 10 significantly more efficient than other generators. Indeed, embodiments of the generator 10 are estimated to achieve charging rates approximately three times greater than other previous generators. Additionally, the increased revolution speeds at the alternator drive shaft 56 also make the generator 10 easier to use by a wider variety of individuals with varying degrees of cycling ability and strength/endurance. The flywheel system included in embodiments of the generator 10 serves further as an inertial energy bank allowing the generator 10 to continue operating for a period of time without the user actively pedaling.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A human-powered generator comprising:
   a frame;

a pedal crankset comprising a pedal operatively connected to a crankset sprocket, the pedal crankset being rotatably mounted on the frame;
a flywheel rotatably mounted on the frame, the flywheel comprising:
a flywheel-crankset sprocket attached to rotate with the flywheel; and
a flywheel-countershaft sprocket attached to rotate with the flywheel;
a countershaft rotatably mounted on the frame, the countershaft comprising:
a countershaft-flywheel sprocket attached to rotate with the countershaft; and
a countershaft-alternator sprocket attached to rotate with the countershaft;
an alternator mounted on the frame and comprising:
an alternator drive shaft; and
an alternator sprocket mounted to the alternator drive shaft;
a crankset-flywheel drive chain operatively extending between the crankset sprocket and the flywheel-crankset sprocket;
a flywheel-countershaft drive chain operatively extending between the flywheel-countershaft sprocket and the countershaft-flywheel sprocket; and
a countershaft-alternator drive chain operatively extending between the countershaft-alternator sprocket and the alternator sprocket;
wherein the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 60 rotations per minute (RPM) and approximately 100 RPM achieves an alternator drive shaft RPM of between approximately 2,000 RPM and approximately 5,000 RPM.

2. The human-powered generator as recited in claim 1, wherein the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 80 RPM and approximately 90 RPM achieves an alternator drive shaft RPM of between approximately 2,500 RPM and approximately 3,500 RPM.

3. The human-powered generator as recited in claim 1, wherein the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of approximately 86 RPM achieves an alternator drive shaft RPM of approximately 3,100 RPM.

4. The human-powered generator as recited in claim 1, wherein:
the crankset sprocket and the flywheel-crankset sprocket have a gear ratio of between approximately 3.0 and approximately 3.5;
the flywheel-countershaft sprocket and the countershaft-flywheel sprocket have a gear ratio of between approximately 3.0 and approximately 3.5; and
the countershaft-alternator sprocket and the alternator sprocket have a gear ratio of between approximately 3.0 and approximately 3.5.

5. The human-powered generator as recited in claim 1, wherein:
the crankset sprocket and the flywheel-crankset sprocket have a gear ratio of between approximately 3.2 and approximately 3.5;
the flywheel-countershaft sprocket and the countershaft-flywheel sprocket have a gear ratio of between approximately 3.2 and approximately 3.5; and
the countershaft-alternator sprocket and the alternator sprocket have a gear ratio of between approximately 3.2 and approximately 3.5.

6. The human-powered generator as recited in claim 1, wherein:
the crankset sprocket and the flywheel-crankset sprocket have a gear ratio of between approximately 3.2 and approximately 3.25;
the flywheel-countershaft sprocket and the countershaft-flywheel sprocket have a gear ratio of between approximately 3.2 and approximately 3.25; and
the countershaft-alternator sprocket and the alternator sprocket have a gear ratio of between approximately 3.4 and approximately 3.5.

7. The human-powered generator as recited in claim 1, wherein:
the crankset sprocket and the flywheel-crankset sprocket have a gear ratio of approximately 3.25;
the flywheel-countershaft sprocket and the countershaft-flywheel sprocket have a gear ratio of approximately 3.2; and
the countershaft-alternator sprocket and the alternator sprocket have a gear ratio of approximately 3.43.

8. The human-powered generator as recited in claim 1, wherein a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 30 to approximately 45.

9. The human-powered generator as recited in claim 1, wherein a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 33 to approximately 40.

10. The human-powered generator as recited in claim 1, wherein a combined gear ratio of the crankset sprocket to the alternator sprocket, as transferred from the crankset sprocket to the flywheel-crankset sprocket, from the flywheel-countershaft sprocket to the countershaft-flywheel sprocket, and from the countershaft-alternator sprocket to the alternator sprocket is between approximately 35 to approximately 37.

11. The human-powered generator as recited in claim 1, further comprising a recumbent seat adjustably mounted to the frame.

12. The human-powered generator as recited in claim 11, wherein the frame comprises:
a crankset bracket;
a flywheel mounting bracket;
a countershaft mounting bracket;
an alternator mounting bracket; and
wheels to facilitate moving the human-powered generator.

13. The human-powered generator as recited in claim 1, further comprising an electrical load operatively connected to the alternator.

14. The human-powered generator as recited in claim 13, wherein the electrical load comprises a battery.

15. The human-powered generator as recited in claim 1, wherein at least one of the crankset sprocket, the flywheel-crankset sprocket, the flywheel-countershaft sprocket, the countershaft-flywheel sprocket, the countershaft-alternator sprocket and the alternator sprocket are user-replaceable with at least one of the crankset-flywheel drive chain, the flywheel-countershaft drive chain, and the countershaft-alternator drive chain to modify a gear ratio of the human-powered generator.

16. The human-powered generator as recited in claim 1, wherein the alternator is rated at between approximately 50 and approximately 100 amps.

17. The human-powered generator as recited in claim 1, wherein the alternator is rated at approximately 70 amps.

18. A human-powered generator comprising:
a frame;
a recumbent seat adjustably mounted on the frame;
a pedal crankset comprising a pedal operatively connected to a crankset sprocket, the pedal crankset being rotatably mounted at a crankset bracket on the frame;
a flywheel rotatably mounted on at a flywheel bracket on the frame, the flywheel comprising:
   a flywheel-crankset sprocket attached to rotate with the flywheel; and
   a flywheel-countershaft sprocket attached to rotate with the flywheel;
a countershaft rotatably mounted at a countershaft bracket on the frame, the countershaft comprising:
   a countershaft-flywheel sprocket attached to rotate with the countershaft; and
   a countershaft-alternator sprocket attached to rotate with the countershaft;
an alternator mounted at an alternator bracket on the frame and comprising:
   an alternator drive shaft; and
   an alternator sprocket mounted to the alternator drive shaft;
a crankset-flywheel drive chain operatively extending between the crankset sprocket and the flywheel-crankset sprocket;
a flywheel-countershaft drive chain operatively extending between the flywheel-countershaft sprocket and the countershaft-flywheel sprocket; and
a countershaft-alternator drive chain operatively extending between the countershaft-alternator sprocket and the alternator sprocket;
wherein the crankset sprocket, the flywheel-crankset sprocket, the flywheel-countershaft sprocket, the countershaft-flywheel sprocket, the countershaft-alternator sprocket and the alternator sprocket are sized such that a pedaling cadence at the pedal crankset of between approximately 60 rotations per minute (RPM) and approximately 100 RPM achieves an alternator drive shaft RPM of between approximately 2,000 RPM and approximately 5,000 RPM.

19. The human-powered generator as recited in claim 18, wherein the flywheel-crankset sprocket is mounted on a first side of the flywheel and the flywheel-countershaft sprocket is mounted on a second side of the flywheel.

20. The human-powered generator as recited in claim 18, wherein the countershaft-flywheel sprocket is mounted on a first side of the countershaft and the countershaft-alternator sprocket is mounted on a second side of the countershaft.

* * * * *